(12) United States Patent
Chang et al.

(10) Patent No.: US 8,249,937 B2
(45) Date of Patent: *Aug. 21, 2012

(54) TIER-BASED DYNAMIC INCENTIVE ARBITRATION IN AN ON-DEMAND COMPUTING ENVIRONMENT

(75) Inventors: Kyusun Chang, Austin, TX (US);
Jagadish Dasari, Austin, TX (US); John Anthony Falkl, Brewster, NY (US); Alfredo V. Mendoza, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 1092 days.

This patent is subject to a terminal disclaimer.

(21) Appl. No.: 12/146,061

(22) Filed: Jun. 25, 2008

(65) Prior Publication Data

US 2008/0255953 A1 Oct. 16, 2008

Related U.S. Application Data

(63) Continuation of application No. 10/922,275, filed on Aug. 19, 2004, now Pat. No. 7,421,402.

(51) Int. Cl.
*G06Q 30/00* (2012.01)
(52) U.S. Cl. .......................... 705/26; 705/27
(58) Field of Classification Search .............. 705/26, 705/27, 37
See application file for complete search history.

(56) References Cited

U.S. PATENT DOCUMENTS

| | | | |
|---|---|---|---|
| 5,848,139 | A | 12/1998 | Grover |
| 6,078,651 | A | 6/2000 | Den Hartog |
| 6,347,224 | B1 | 2/2002 | Smyth et al. |
| 6,546,374 | B1 | 4/2003 | Esposito et al. |
| 6,587,838 | B1 | 7/2003 | Esposito et al. |
| 7,421,402 | B2 | 9/2008 | Chang et al. |
| 2004/0111308 | A1* | 6/2004 | Yakov .................. 705/8 |
| 2004/0133506 | A1* | 7/2004 | Glodjo et al. ........... 705/37 |
| 2006/0069621 | A1 | 3/2006 | Chang et al. |
| 2006/0167703 | A1 | 7/2006 | Yakov |
| 2008/0167703 | A1 | 7/2008 | Kasprzak |

OTHER PUBLICATIONS

Foster, Ian, The Grid: Computing without Bounds, Scientific America, Apr. 2003, vol. 288 Issue 4, p. 78, 8p, 1 chart, 1c, downloaded from ProQuest on the Internet on Mar. 16, 2008.

(Continued)

*Primary Examiner* — James Zurita
(74) *Attorney, Agent, or Firm* — Robert H. Frantz; Mark C. Vallone; David A. Mims, Jr.

(57) ABSTRACT

A system for allocating resources which are anticipated to be available in an on-demand computing at some time in the future, wherein a producer trending agent (PTA) lists resources according to a trend prediction of resource availability in the past, a consumer trending agent (CTA) places bids for listed resources according to previous resource usage trends, and an arbitration system (REAS) matches the bids with the listings to determine if a match exists. If so, a binding contract for consumption of the matched listed resources is established. The PTA also produce tier-based dynamic incentive (TDI) schema which divides potential bidders into tiers, and offers additional resource incentives according to the tiers. Both PTA and CTA dynamically update their available/usage trends, listings and bids, over time.

36 Claims, 8 Drawing Sheets

OTHER PUBLICATIONS

"Data Center" by searchDatabase.com Definitions downloaded from http://searchdatabase.techtarget.com/sDefinition on Jun. 23, 2004.
"On-Demand Computing" by searchCIO.com Definitions, downloaded from http://searchcio.techtarget.com/sDefinition on Jun. 23, 2004.
"Utility Computing" by seachSmallBizIT.com Definitions downloaded from SearchSmallBizIt.com on Jun. 23, 2004.
USPTO and Chang; examination correspondence in related U.S. Appl. No. 10/922,275, filed Aug. 19, 2004, now U.S. patent 7,421,402.

* cited by examiner

TIER-BASED DYNAMIC INCENTIVE ARBITRATION IN AN ON-DEMAND COMPUTING ENVIRONMENT

CROSS-REFERENCE TO RELATED APPLICATIONS (CLAIMING BENEFIT UNDER 35 U.S.C. 120)

This application is a continuation of U.S. patent application Ser. No. 10/922,275, filed on Aug. 19, 2004 now U.S. Pat. No. 7,421,402, by Kyunsun Chang, et al.

CROSS-REFERENCE TO RELATED APPLICATIONS

None.

FEDERALLY SPONSORED RESEARCH AND DEVELOPMENT STATEMENT

This invention was not developed in conjunction with any Federally-sponsored contract.

MICROFICHE APPENDIX

Not applicable.

INCORPORATION BY REFERENCE

The related U.S. patent application Ser. No. 10/922,275, filed on Aug. 19, 2004, by Kyunsun Chang, et al., is incorporated by reference in its entirety.

BACKGROUND OF THE INVENTION

1. Field of the Invention

This application is a continuation of U.S. patent application Ser. No. 10/922,275, filed on Aug. 19, 2004, by Kyunsun Chang, et al., which is currently under allowance. This invention relates to surplus or excess resource management, allocation and arbitration in on-demand computing environments such a in utility computing, data center, and grid computing environments.

2. Background of the Invention

As business demand increases, the depth of technology improvements and its intelligence to handle multiple processes becomes highly desirable and crucial. In any enterprise operations, it is difficult to manage effectively the ever-fluctuating resources available while maximizing the resource utilization. Because an enterprise's demand on computing resources can vary drastically from one time to another, it is challenging to maintain a cost-effective balance in resource allocation to meet various scenarios. In fact, Infrastructure Technology ("IT") costs can become very expensive when maintaining sufficient resources to meet peak requirements. On the other hand, if enterprise reduces costs by maintaining minimal computing resources, there will be insufficient resources accessible to meet peak requirements.

Because of this dilemma, the On-Demand ("OD") Computing enterprise model was developed to solve this problem. This model allows computing resources to be made available to the user on an as-needed basis. The resources may be housed within the enterprise or handled by a third party service provider. Major IT vendors in the marketplace such as IBM, Microsoft, HP and Sun Microsystems are developing OD Computing products to help companies to respond to the dynamic business environments at a faster pace. In addition, other new IT concepts such as grid computing and utility computing emerged under this broad category.

Utility computing is an on-demand approach that combines outsourced computing resources and infrastructure management with a usage-based payment structure. It is a service-provisioning model that allows service providers to make resources available to customers as needed then charges usage costs rather than the typical flat rate. The utility model aims to maximize the efficient use of resources while using metered services to minimize the associated costs.

These computing resources are normally organized into data centers. A data center is a centralized repository for the storage, management, and dissemination of data and information organized around a particular area or body of knowledge. For example, the National Climatic Data Center ("NCDC") maintains the world's largest archive of weather information. Website visitors can request weather related questions to the NCDC for response.

A data center can also be a highly specialized facility that houses various websites and provides data serving and other services for other companies. This kind of data center may contain a network operations center ("NOC"), which is a restricted access area containing automated systems that constantly monitor server activity, web traffic, and network performance. In fact, problem reports can be generated to IT staffs to bring awareness for potential problems even before they occur. Within a company, a data center can describe the central data processing facility or the group of people who manages the company's data processing and networks.

Similarly, grid computing is an emerging technology that utilizes a collection of systems and resources to deliver qualities of services. It is distributed computing at its best, by creating a virtual self-managing computer, the processing for which is handled by a collection of interconnected heterogeneous systems sharing different combinations of resources. In simple terms, grid computing is about getting computers to work together, and allowing businesses, or grid participants, to optimize available resources.

The framework to grid computing is large-scale resource sharing, which exists within multiple management domains, typically involving highly parallel applications connected together through a communications medium, and organized to perform one or more requested jobs simultaneously. Each grid resource's characteristics can include, but are not limited, to processing speed, storage capability, licensing rights, and types of applications available.

Grid computing's architecture is defined in the Open Grid Services Architecture ("OGSA"), which includes a basic specification Open Grid Services Infrastructure ("OGSI").

Using grid computing to handle computing jobs of all sizes, and especially larger jobs such as enterprise processes, has several advantages. First, it exploits underutilized resources on the grid. For example, if a financial services company suddenly encounters a 50% increase in stock trade transactions during a 30-minute time period, using a traditional systems process, the company would face an increase in network traffic, latent response and completion time, bottleneck in processing and even overload on its resources due to its limited or fixed computational and communications resources.

In a similar situation, however, grid computing can adjust dynamically to meet the changing business needs, and respond instantly to stock transaction increase using its network of unused resources. For example, a grid computing system could run an existing stock trading application on four underutilized machines to process transactions, and deliver results four times faster than the traditional computing architecture. Thus, grid computing provides a better balance in resource utilization and enables the potential for massive parallel CPU capacity.

In addition, because of its standards, grid computing enables and simplifies collaboration among many resources and organizations from a variety of vendors and operators. Grid computing provides sharing capabilities that extends to additional equipment, software, services, licenses and others. Furthermore, the grid can offer more advanced resource load balancing. A relatively idle machine may receive an unexpected peak job, or if the grid is fully utilized, priorities may be assigned to better execute the number of requested jobs. By using a Grid Management System ("GMS") scheduler, a grid can provides excellent infrastructure for brokering resources.

Within a Grid or other on-demand computing environment, there will almost always be pools of some free resources. CPU and disk storage are examples of resources that can be free or idle at any point in time. "Resource providers", also known as producers, own these free resources, while the companies that require CPU and disk storage to run its IT needs are the "consumers" within the grid or on-demand environment. By agreement on value, consumers sign a contract with resource providers to consume a predetermined amount of guaranteed resources allocated for an agreed price for set amount of time. Consumers are responsible for actual usage and any additional resource require will be have its extra costs levied once the consumer exceeds its previously set capacity.

Although both grid and utility computing provide a better method for consumers to access and collaborate resources on an as-needed basis, it does not create a demand environment that promotes to consumers the number of available resources. Typically, excess capacity remains idle until a consumer initiates an order for more resource requirement. In addition, because service providers are deficient in marketing unused resources, there also lacks a definitive "value" on the underutilized resources.

Therefore, there exists a need in the art of a systematic approach to create a marketplace that facilitates the demand for excess unused resource capacity. In addition, there exists a need in the art of creating "worth" or "value" for available resources in order for respective parties to enter into contractual agreements for goods and services exchanged. Furthermore, there exists a need in the art of optimizing available resources to allow usage at its optimum capacity at any given time.

BRIEF DESCRIPTION OF THE DRAWINGS

The following detailed description when taken in conjunction with the figures presented herein present a complete description of the present invention.

SUMMARY OF THE INVENTION

Figure 1:
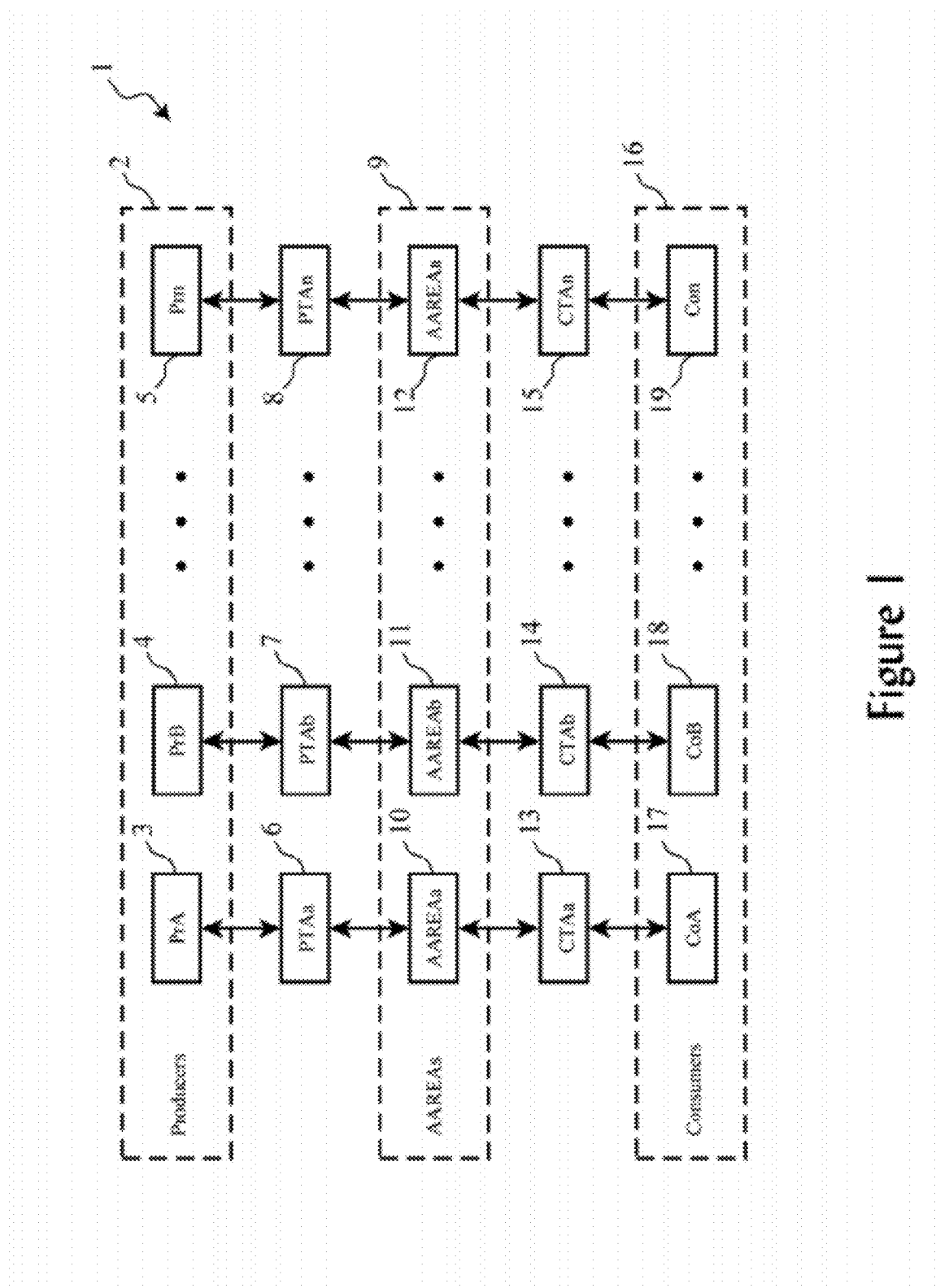
FIG. 1 describes the fundamental architecture of the present invention.

The present invention enables service providers to market unused idle resources to consumers. The invention provides a method to allow both consumers and service providers to exchange listed goods and services for an agreed price using the proposed Agent-Based Resource Entitlement Arbitration System ("AAREAS"). This allows all available resources to be utilized at its optimum usage. In addition, consumers have the opportunity to make offers on available resources, which can result in dramatic IT cost savings.

According to one aspect of the present invention, a Tiered-Based Dynamic Incentive Arbitrator is introduced to provide resource valuation at its best within the auction system. By using this combination, producers and consumers will be able to exchange goods and services within a competitive dynamic environment with quicker negotiation response time.

As such, the invention enables the consumers to fully purchase any unused resources from service providers which results in higher resource utilization and IT cost savings for consumers under an auction setting.

DETAILED DESCRIPTION OF THE INVENTION

The present invention is preferably realized in conjunction with an on-demand computing technology or architecture, such as a grid computing environment. As the present invention's benefits are not limited to grid computing environment alone, it will be recognized by those skilled in the art that our disclosure of specific implementation details with respect to grid environments does not limit the scope of the invention to such. It is within the skill of those in the art to adapt and configure the present invention for use with other on-demand computing technologies, including but not limited to data centers and utility computing.

The following definitions will be employed throughout this disclosure:

(a) "Grid environment" and "on-demand computing environment" shall mean a collection of computing resources such as servers, processors, storage systems, and communications media, ranging from just a few machines to groups of machines organized as a hierarchy potentially spanning the world;

(b) "Job" shall mean a desired requested task that a client initiates to be processed using available and selected resources;

(c) "Resources" shall mean any system, hardware or software module that is available for use in completing a job, such as application programs, hardware, software licenses, storage and related components;

(d) "Metered services" (also called pay-per-use) shall mean any type of payment structure in which a customer has access to potentially unlimited resources but only pays for what they actually use.

(e) "Bid" shall mean an offer of value for exchange of goods or services;

(f) "Marketplace" shall mean a forum compose of producers and consumers and its representing agents for exchange of goods and services;

(g) "Reserve Price" shall mean the minimum price a producer is willing to accept for a listed resource;

(h) "Winning Bidder" shall mean a bidder who has met or exceeded the reserve price and has the highest bid in an auction;

(i) "Auction" shall mean a sale in which goods or services are exchanged between participants to the highest bidder; and (j) "Value" shall mean an amount considered to be a fair and suitable equivalent for exchange of goods and services between parties.

Computing Platform Suitable for Realization of the Invention

The invention, in one available embodiment, is realized as a feature or addition to software products, such as IBM's grid computing products, for execution by well-known computing platforms such as personal computers, web servers, and web browsers.

As the computing power, memory and storage, and communications capabilities of even portable and handheld devices such as personal digital assistants ("PDA"), web-enabled wireless telephones, and other types of personal information management ("PIM") devices, steadily increases over time, it is possible that the invention may be realized in software for some of these devices, as well.

Therefore, it is useful to review a generalized architecture of a computing platform which may span the range of implementation, from a high-end web or enterprise server platform, to a personal computer, to a portable PDA or web-enabled wireless phone.

Figure 7:
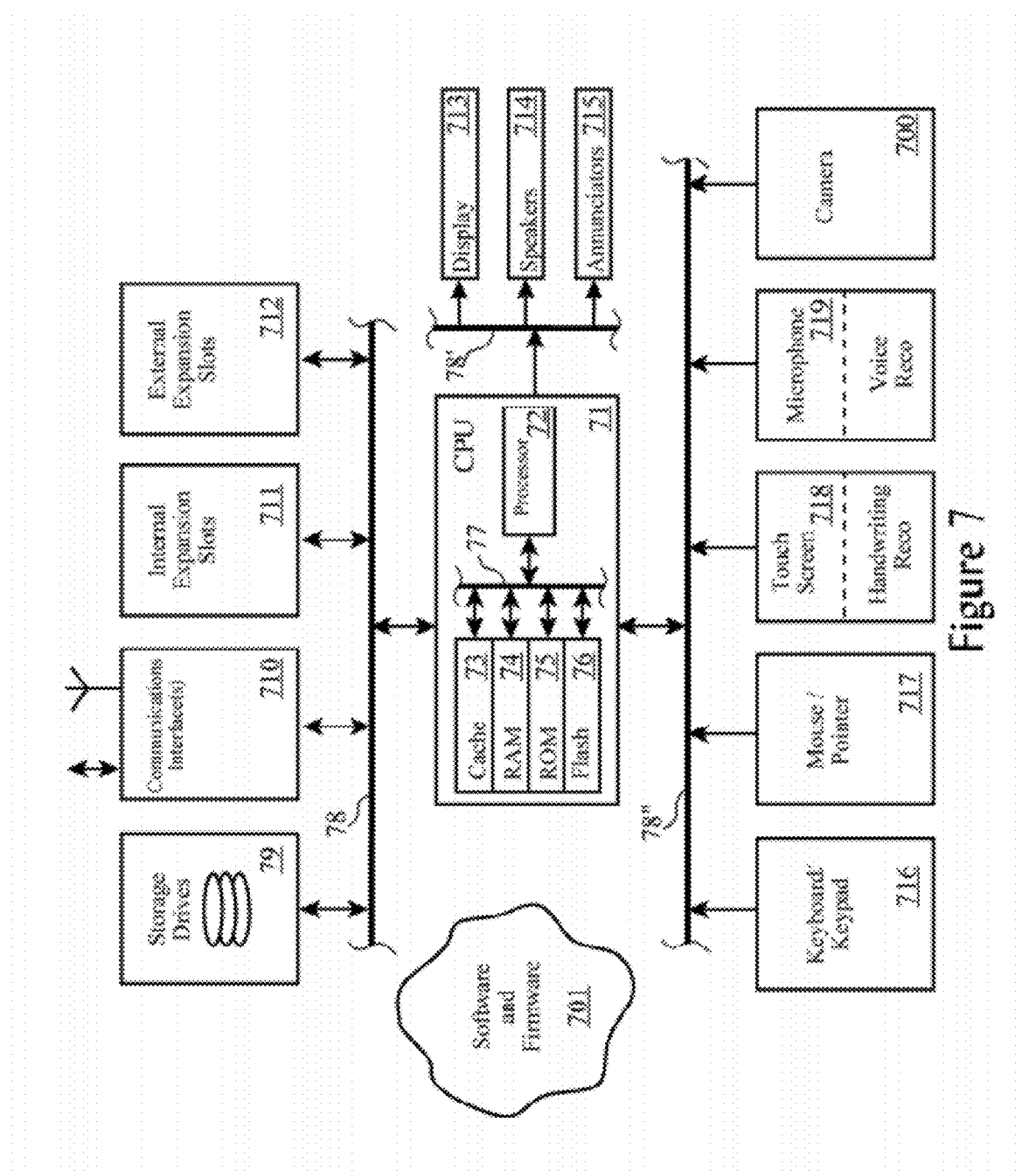
FIG. 7 depicts a generalized computing platform, suitable for implementation of the invention according to one available embodiment.

Turning to FIG. 7, a generalized architecture is presented including a central processing unit (71) ("CPU"), which is typically comprised of a microprocessor (72) associated with random access memory ("RAM") (74) and read-only memory ("ROM") (75). Often, the CPU (71) is also provided with cache memory (73) and programmable FlashROM (76). The interface (77) between the microprocessor (72) and the various types of CPU memory is often referred to as a "local bus", but also may be a more generic or industry standard bus.

Many computing platforms are also provided with one or more storage drives (79), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (710), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (711), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (712) allowing the user the ability to easily install and remove hardware expansion devices, such as PCMCIA cards, SmartMedia cards, and various proprietary modules such as removable hard drives, CD drives, and floppy drives.

Often, the storage drives (79), communication interfaces (710), internal expansion slots (711) and external expansion slots (712) are interconnected with the CPU (71) via a standard or industry open bus architecture (78), such as ISA, EISA, or PCI. In many cases, the bus (78) may be of a proprietary design.

A computing platform is usually provided with one or more user input devices, such as a keyboard or a keypad (716), and mouse or pointer device (717), and/or a touch-screen display (718). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (718) is usually provided, often with handwriting recognition capabilities.

Additionally, a microphone (719), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (700), such as a still digital camera or full motion video digital camera.

One or more user output devices, such as a display (713), are also provided with most computing platforms. The display (713) may take many forms, including a Cathode Ray Tube ("CRT"), a Thin Flat Transistor ("TFT") array, or a simple set of light emitting diodes ("LED") or liquid crystal display ("LCD") indicators.

One or more speakers (714) and/or annunciators (715) are often associated with computing platforms, too. The speakers (714) may be used to reproduce audio and music, such as the speaker of a wireless telephone or the speakers of a personal computer. Annunciators (715) may take the form of simple beep emitters or buzzers, commonly found on certain devices such as PDAs and PIMs.

These user input and output devices may be directly interconnected (78', 78") to the CPU (71) via a proprietary bus structure and/or interfaces, or they may be interconnected through one or more industry open buses such as ISA, EISA, PCI, etc. The computing platform is also provided with one or more software and firmware (701) programs to implement the desired functionality of the computing platforms.

Figure 8:
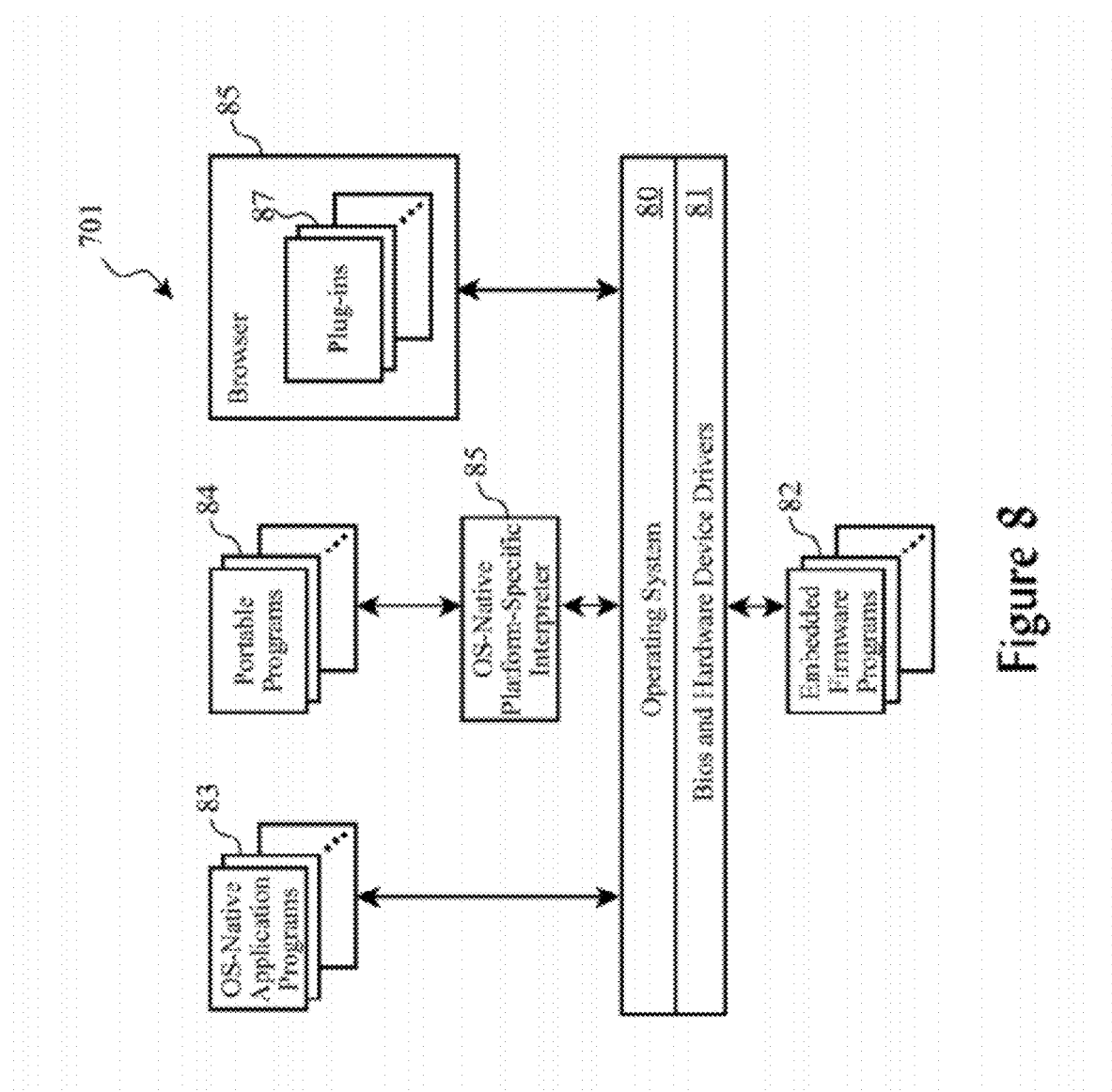
FIG. 8 provides more details of the software organization of the platform of FIG. 7.

Turning to now FIG. 8, more detail is given of a generalized organization of software and firmware (701) on this range of computing platforms. One or more operating system ("OS") native application programs (83) may be provided on the computing platform, such as word processors, spreadsheets, contact management utilities, address book, calendar, email client, presentation, financial and bookkeeping programs.

Additionally, one or more "portable" or device-independent programs (84) may be provided, which must be interpreted by an OS-native platform-specific interpreter (825), such as Java™ scripts and programs.

Often, computing platforms are also provided with a form of web browser or micro-browser (826), which may also include one or more extensions to the browser such as browser plug-ins (827).

The computing device is often provided with an operating system (820), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (81) are often provided to allow the operating system (80) and programs to interface to and control the specific hardware functions provided with the computing platform.

Additionally, one or more embedded firmware programs (82) are commonly provided with many computing platforms, which are executed by onboard or "embedded" microprocessors as part of the peripheral device, such as a micro controller or a hard drive, a communication processor, network interface card, or sound or graphics card.

As such, FIGS. 7 and 8 describe in a general sense the various hardware components, software and firmware programs of a wide variety of computing platforms, including but not limited to personal computers, PDAs, PIMs, web-enabled telephones, and other appliances such as WebTV™ units. It will be readily recognized by those skilled in the art that the methods and processes disclosed herein may be alternatively realized as hardware functions, in part or in whole, without departing from the spirit and scope of the invention.

Suitable On-Demand Computing Environment

As stated in the foregoing paragraphs, the present invention is useful with a wide variety of on-demand computing technologies and architectures. For ease in understanding, our disclosure will focus on implementation with one such architecture offered by International Business Machines ("IBM"). The invention, however, may be realized in conjunction with other types of on-demand computing systems, as well.

Figure 5:
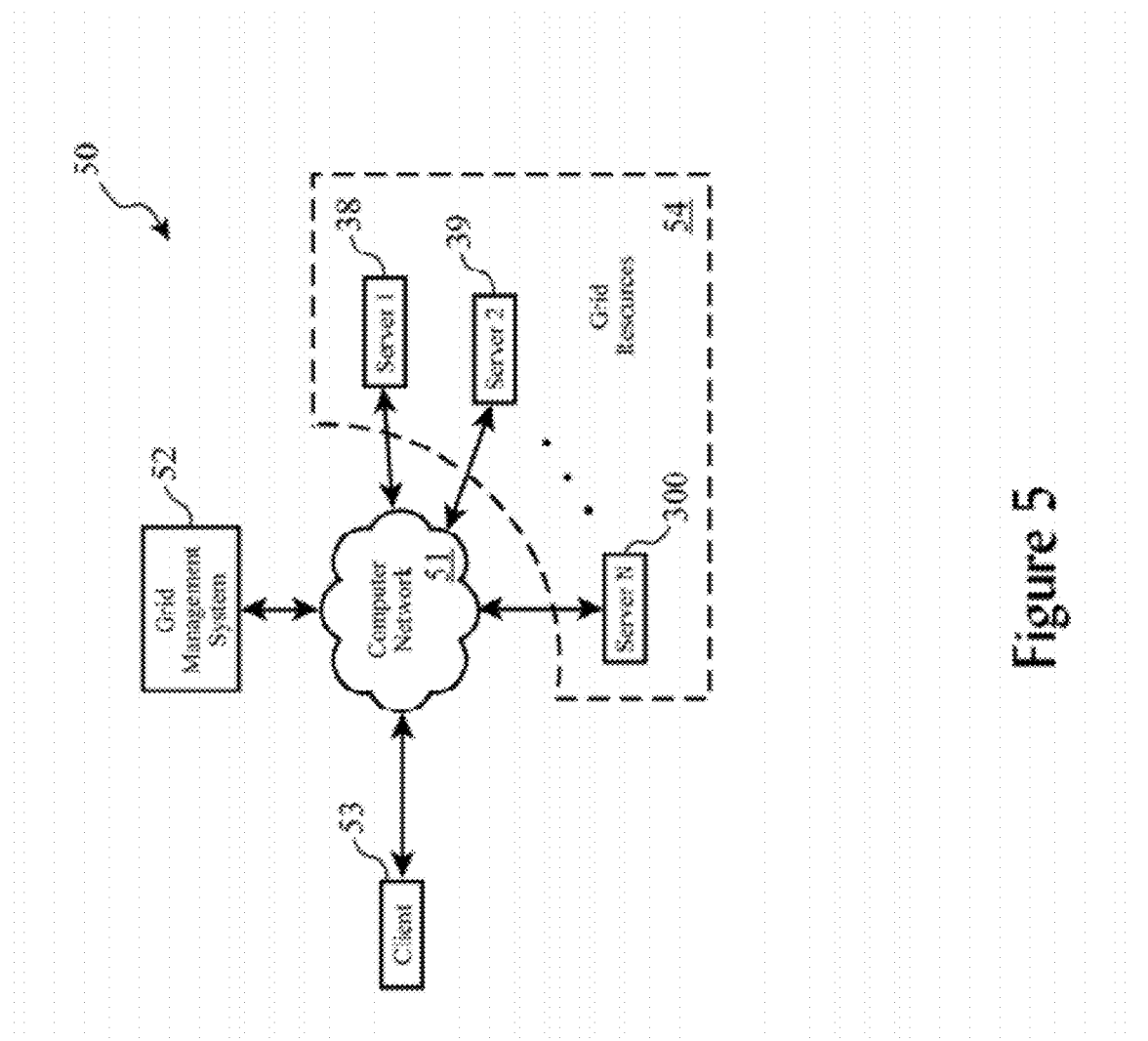
FIG. 5 shows a high-level perspective of grid computing in general.

Turning to FIG. 5, the new computing paradigm of grid computing (50) is illustrated at a high level. A client (53), such as an FBI analyst using a client computer, requests a computational job or task, a cross-agency list of suspected terrorists, to be performed by the grid. The job is submitted via a communications network (51) to a Grid Management System ("GMS") (52), which makes a selection of which grid resources (54) from grid vendor(s) to use based on client job criteria (e.g. response time, cost, accuracy, etc.) and resource characteristics, such as server capability, resource availability, storage capacity, and cost.

Once the GMS determines a specific vendor(s) (38, 39, 300) to which the job will be contracted (or among whom the job will be divided), requests are sent to use the selected grid resources (54), such as resources provided by Server 1 (38). Server 1 (38) would then process the job as required, and would return job results, such as a terrorist name list, back to the requesting client (53), such as the FBI analyst, via the communications network (51).

Figure 3:
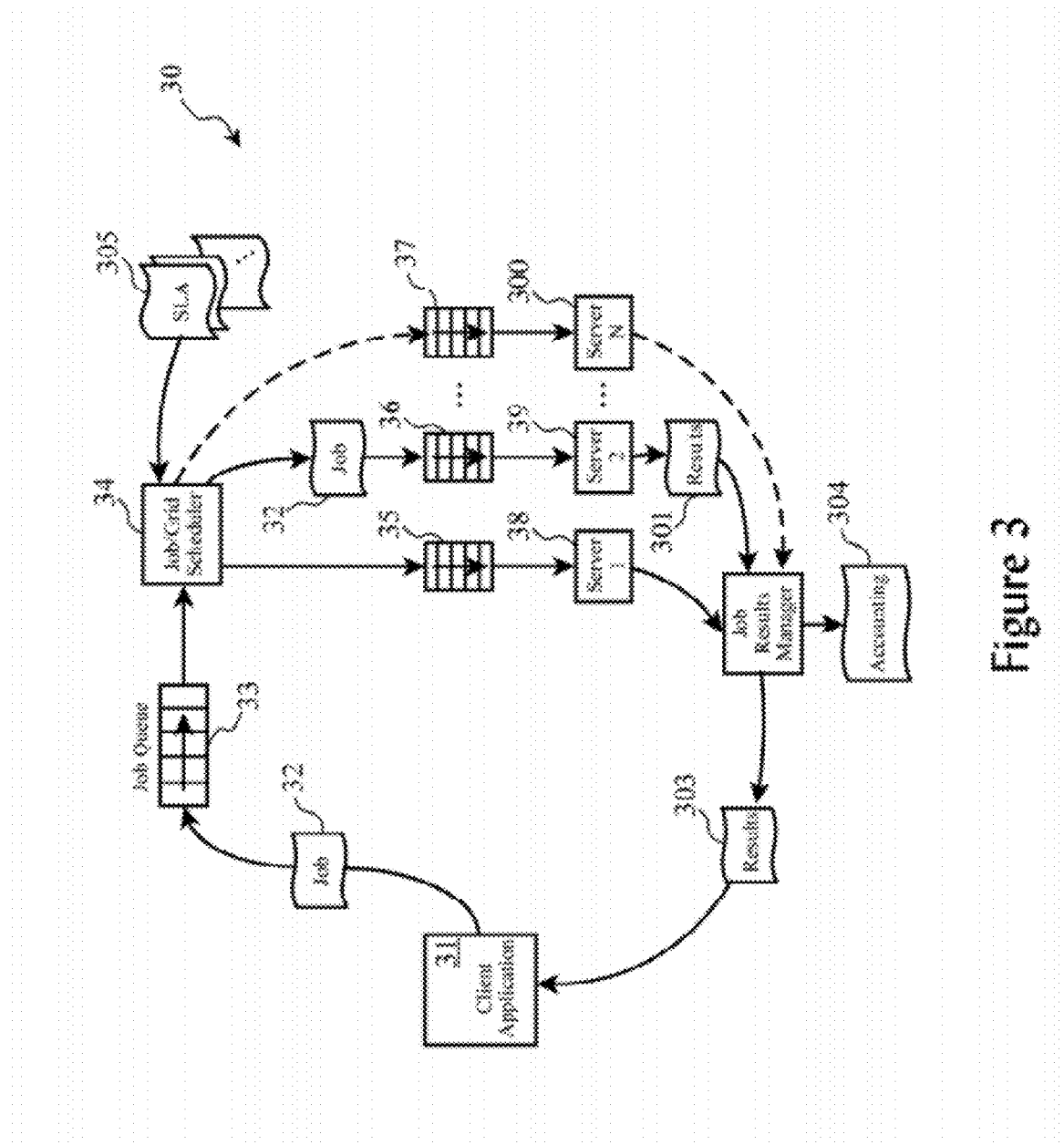
FIG. 3 provides a high-level view of how grid computing functions are accomplished.

FIG. 3 provides a more detailed illustration (30) of how grid computing functions at a lower level. When a job (32) is submitted by a client application (31) to the grid, the job (32) is received into a grid inbound job queue (33), where it awaits assignment to one or more grid resources.

A Job/Grid Scheduler ("JGS") (34) retrieves each pending job from the inbound job queue (33), verifies handling requirements against one or more SLA (305) to determine processing requirements for the job, and then selects which server or servers (38, 39, 300) to assign to process the job (32) via their job queues (35, 36, 37). In this illustration, Server 2 (39) has been selected, so the job (32) is transferred to Server 2' job queue (36) to be processed when the server becomes available (immediately if adequate processing bandwidth is already available). Some servers may handle their job queues in an intelligent manner, allowing jobs to have priority designation which allows them to be processed quicker or sooner than earlier-received, lower priority jobs.

Eventually, the assigned server completes the job and returns the results (301) to a Job Results Manager ("JRM") (302). The JRM can verify job completion, deliver the results (301) to the client application (31), and can generate job completion records as necessary to achieve billing and invoice functions for proper accounting (304).

Figure 4:
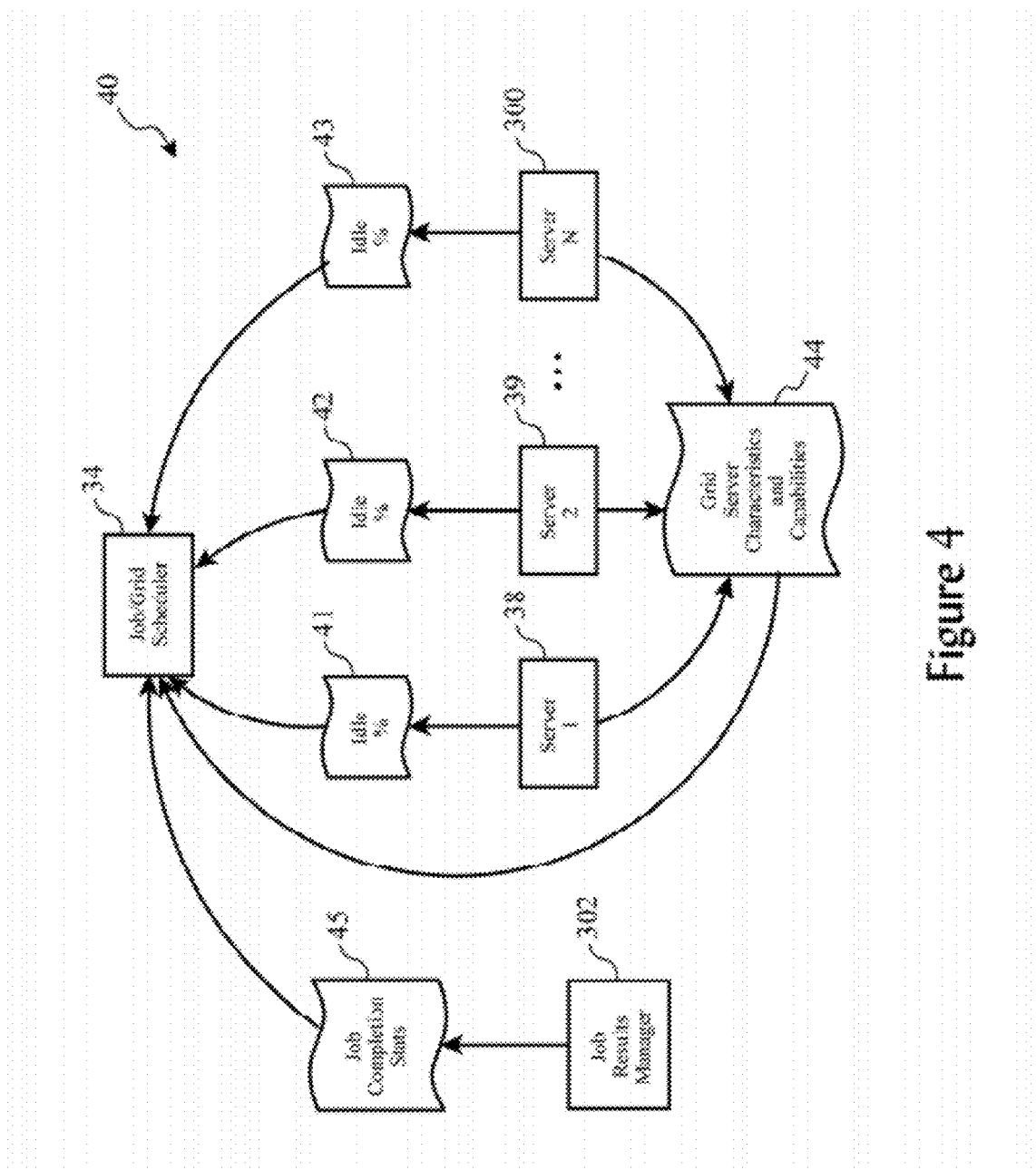
FIG. 4 illustrates the general process for selecting a grid resource.

Turning now to FIG. 4, more details of the resource selection process (40) are shown. Each grid resource (38, 39, 300) may report in real-time its availability or "percent idle" (41, 42, and 43) to the Job/Grid Scheduler (34). Additionally, a set of grid resource characteristics and capabilities (44) is compiled, either statically, dynamically, or both, which is also available for the JGS (34) to use. Some server characteristics may be static, such as hardware characteristics (e.g. installed memory, communications protocols, or licenses), which other characteristics may be more dynamic in nature, such as number of licenses available for a certain application program (e.g. PDF generators, video compressors, etc.). Additionally, the completion statistics (45) from the Job Results Manager (302) are preferably available to the JGS (34), as well.

Through consideration of these factors regarding the grid resources, and in combination with the Service Level Agreement client requirements, the JGS can select one or more appropriate grid resources to which to assign each job. For example, for high-priority jobs that require immediate processing, the JGS may select a resource which is immediately available, and which provides the greatest memory and processing bandwidth. For another job which is cost-sensitive but not time critical, the JGS may select a resource which is least expensive without great concern about the current depth of the queue for handling at that resource.

Agent-Based Resource Entitlement Arbitration System

Currently, customers purchase a predetermined amount of resources with the negotiated pricing structure within certain restrictions such as type of resources, time of usage, amount of usage and method of usage from service providers. These contract negotiations typically require several iterations and considerable effort by both parties.

However, when an unexpected business demand occurs, customers may require additional resource capacity that exceeds its contractual agreement. Thus, a customer's requests for additional resource requirements will yield a higher premium for its service provider. Conversely, if the service providers have unused available resources at any given time, there is no dynamic "marketplace" that allows service providers to notify customers resource availability and allow for bidding to take place. As a result, customers do not have the opportunity to seize business advantage to purchase available resources at a potentially lower price for future usage.

The preferred embodiment of the present invention, which we call an Agent-Based Resource Entitlement Arbitration System ("AAREAS"), is a system that allows consumers to bid on free resources from resource providers that allow the free resources to be used at a lower price point while waiting for a consumer to order for more resources.

The AAREAS allows resource providers to register its available free resources and allow consumers the ability to place bids on resources. Any free resources can be registered in any format such as a catalogue with the necessary detail description information alongside. Features such as CPU resource with a particular Operating System such as AIX, Linux, Windows or UNIX with middleware such as DB2, WebSphere, and Message Queue systems and its time availability will be described. For example, within a catalog entry a resource provider can list a UNIX system with DB2 currently in use today is not scheduled for any work in two days time. Thus, consumers, in return, will be able to place bids on exact or near exact resources that they need based on the information provided.

The AAREAS enables consumers the flexibility to obtain resources at a lower premium rates than the penalty charges consumers pay when they exceed predetermined usage plan. Additionally, resource providers have a more effective method to optimize its resource utilization by allowing free resources to be purchase for a limited time at an accepted bid price for any time frame such as by hour, days or weeks. Furthermore, resource providers have the option to note any restrictions or specifications that may apply on a case-by-case scenario. Consequently, any idle resources will have a greater potential to be fully utilized at any given time using the AAREAS.

Turning to FIG. 1, our architecture (1) is shown which illustrates the logical processes for consumers and resource providers interact for resource exchange. Service providers (also sometimes referred to as producers) (2) PrA, PrB through Prn (3, 4, 5) all supply their own respective types of resources to the on-demand computing environment.

A set of Producer Trending Agents ("PTA") (6, 7, 8) are provided, which are monitoring systems that work on behalf of each "producer", and which facilitate listing or offering of free resources from those producers (2). A PTA can be programmed to list which free resources can be placed into the AAREAS. Additionally, it can also be programmed to use historical trend data to predict future available pools of resources for use. Each PTA such as PTAa, PTAb, and PTAn manages each resource provider and its available resources.

Each "consumer" or user of services (16) from the on-demand computing architecture, such as consumers CoA, CoB and CoN (17, 18, 19), also has their own monitoring system, called a Consumer Trending Agent ("CTA") (13, 14, 15). The CTAs, such as CTAa, CTAb, CTAn, represent each consumer with its best interest and facilitates the bidding process. Based on consumer preferences, the CTA automatically places bids on offered or listed resources based on recent historical usage data and consumption for the consumer which it represents. The consumer can program the CTA to start bidding at a specific price, optionally with set incremental values and with a limit to the maximum bid price point.

The AAREAS (9) scans a database (not shown) and performs matching between listed resources from the PTAs and requests from CTAs. The AAREAS (9), preferably implemented as middleware (10, 11, 12), attempts to match the exact criterion from both parties (e.g matching listed resources to requested resources).

For example, assume PTAa (6) lists a CPU with DB2 database on computer running AIX operating system is available on day 2 for 6 hours, being provided by producer PrA (3). Further assume that during this period of time, CTAa (13) seeks an available resource to process invoicing job within 72 hours for 6 hours on behalf of consumer CoA (17). The AAREAS (9) middleware AAREAa (10) matches the two-parties requirements (e.g. PrA and CoA), and creates a bidding environment for CTAa (13) to make an offer for PTAa's (6) listed resource.

The bidding process continues until PTAa agrees to a bid price for the specified resource from the bidding agent, in this case CTAa (13). During this process, other participating CTA's (14, 15) are also allowed to bid on the same resources being listed by PTAa (6), and the bidding CTAa (13) may bid on suitable resource which are being offered by other PTAs (7, 8), until each resource is consumed or assigned to a consumer according to a mutually-agreeable price and performance criteria. Preferably, the AAREAS (9) notifies all participating PTAs and CTAs of auction results, and each corresponding system releases information to its respective parties.

The AAREAS (9) is preferably composed of more than one entity that can be implemented individually due to geographic locations or due to different AAREAS (10, 11,12) implementations by different companies, as illustrated. In this arrangement, all the AAREAS middleware modules communicate and cooperate with each other to find the best fit for a specific resource need that a registered consumer is seeking. In an alternate embodiment, the AAREAS middleware may be realized as a centralized service, which can ease implementation and maintenance in some scenarios.

Tier-Based Dynamic Incentive Arbitrator

Although the AAREAS solves the problem for resource utilization to be at its optimal usage, it does not have any price reservation points inherent to it in the preferred embodiment. Through use of the AAREAS alone as thus-far described, any consumers with its CTA can bid for any listed resource using the AAREAS without much prior restriction or limitation.

To provide more value for free resource pools, the preferred embodiment comprises a Tiered-Based Dynamic Incentive Arbitrator ("TBDIA"), which facilitates the resource valuation. This enables the producers to generate a greater return on their offered or listed resources, which encourages the broader use of the AAREAS system.

The "tiering" is based on groups of bidders (e.g. consumers) that can bid by invitation only, or by bidders who can meet the set reserved price as a criterion. Each tier has a lowering trend of reserve pricing until the "no-reserved" price auction scheme is reached. By providing our tiers, bidders are limited to those who can afford the reserved price, such as consumers who urgently need resources but still can make a purchase at a lower price.

The AAREAS matches a CTA's request with a resource's listed criterion. As an incentive for bidding on tiers, the resource producers can grant extra benefits to winning bidders such as granting extra resource usage on future bids. These special incentives may be resources that have atypical configurations or leftover resources. The producers have the flexibility to dynamically offer incentives to be listed on the AAREAS. In addition, the TBDIA limits the number of bidders competing for free resources that otherwise would remain idle.

Figure 2:
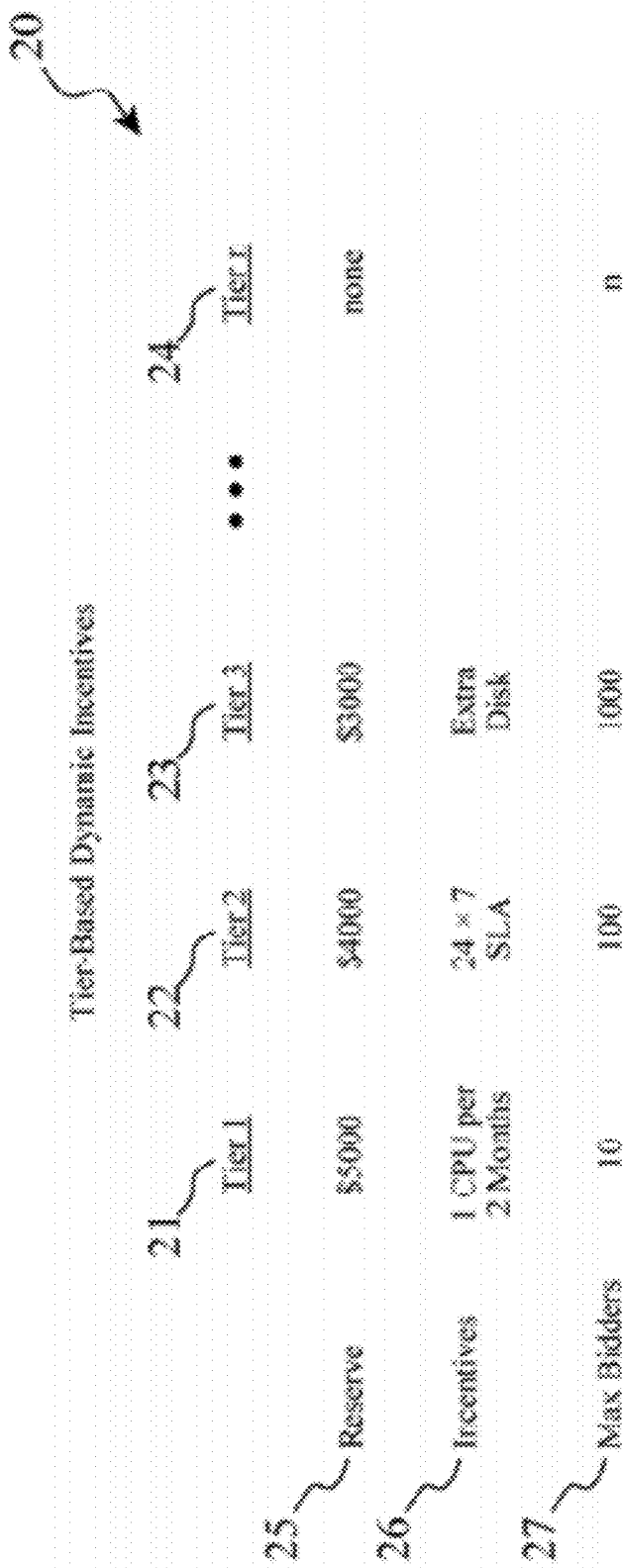
FIG. 2 illustrates the Tier-Based Dynamic Incentive schema employed by our invention.

Turning to FIG. 2, the table illustrates an example of Tier-based Dynamic Incentives schema (20). Under each tier category, such as Tier 1, Tier 2, Tier 3 and Tier n (21, 22, 23, 24, respectively), the auction is limited to those who meet listed requirements such as reserve price (25), incentives (26) and maximum number of bidders (27). In this example, in Tier 3 (23), the minimum or reserve price (25) is set at $3,000 with extra disk storage as its attractive incentive (26), with no more than 1000 bidders allowed within the auction. Therefore, only consumers who have met the reserve price can have the option to participate in the auction, not exceeding 1000 bidding participants. The winner of the auction is also granted the incentive, such as the extra disk storage as shown here.

This achieves two objectives. First, the offerer can provide unused resources as the incentives, thereby enhancing the value to the consumer of the listed resources available for bid. Second, the consumer is encouraged to bid a higher amount for these offered resources as they provide additional value to them, which increases the return to the provider for the listed resources.

Implementation

Figure 6:
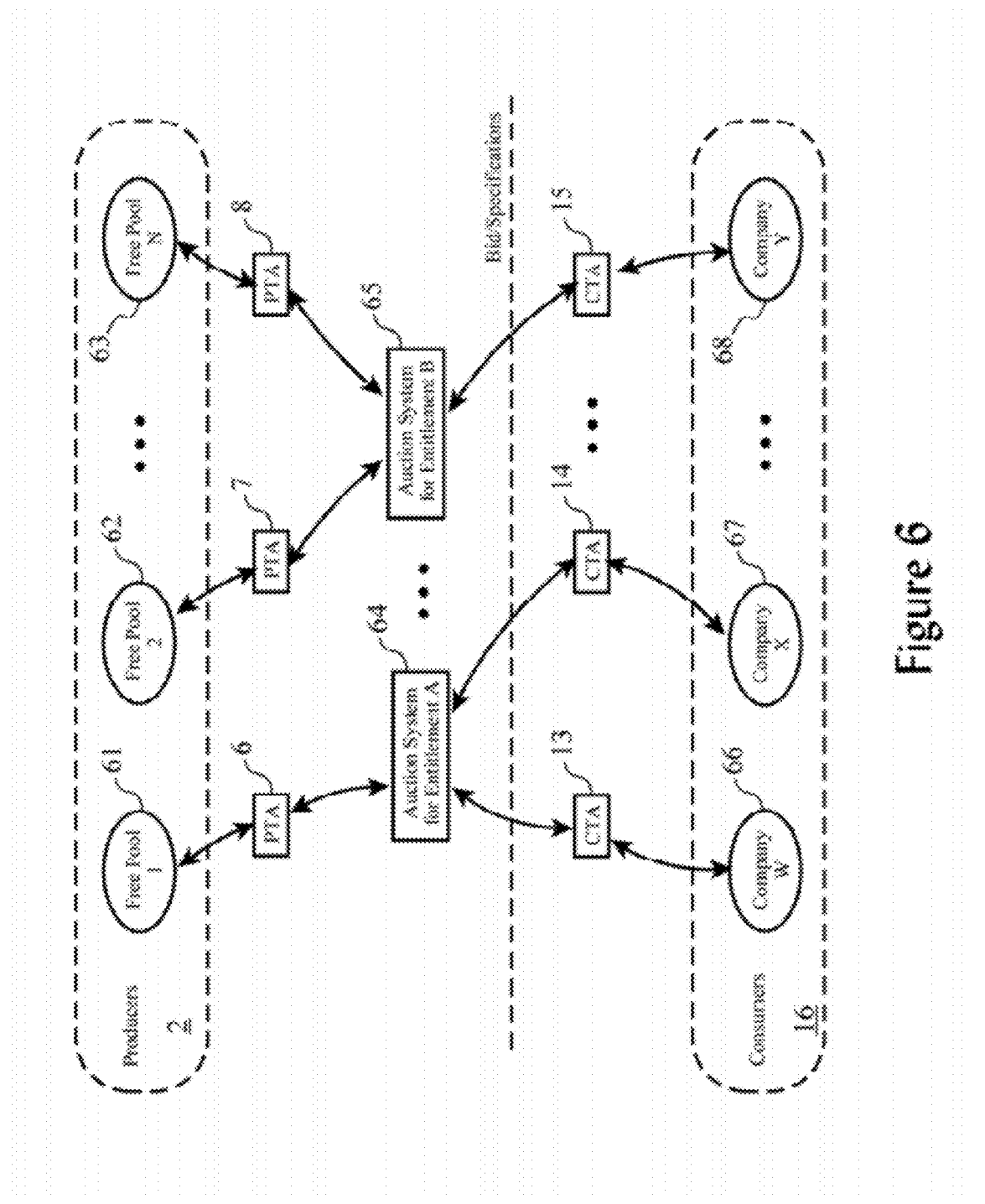
FIG. 6 shows the auction based entitlement system and process of our invention.

The AAREAS is preferably implemented as an auction based entitlement system. The diagram of FIG. 6 shows an embodiment (60) of our auction based entitlement system invention. The consumers (16) typically include of different companies such as Company W, X and Y (66, 67, 68), or alternatively different departments, different agencies, etc. Each consumer is provide a CTAs (13, 14, 15) that represents the consumer on their behalf with its best interest in the AAREAS.

Each PTA (6, 7, 8) represents a pool of free resources (61, 62, 63) from each resource providers or producers (2), and lists its specific bidding requirements and incentives within the AAREAS. Within each auction system (64, 65), there are provided bid specifications and incentives (64', 65'), including the previously-described TBDIA schema.

The auction systems conduct matches between bids submitted by the CTAs and bid specifications provided by the PTAs until the auctions close (e.g. resources are no longer available) or a winning bidder is determined. The auction system's main goal is to facilitate a seamless match for consumer bids on free resources. Once each auction ends, participating consumers are notified on bid status.

As such, the AAREAS constantly provides a marketplace to meet the dynamic demands from both consumers and producers. The AAREAS is preferably implemented in Java and web services technology which exposes its interface to the CTAs and the PTAs. Several AAREAS middleware modules communicate through web services calls, as well. All communications between PTAs, CTAs and auction system is preferably conducted via a secured protocol, such as Hypertext Transfer Protocol over Secured Socket Layer ("HTTPs") or Simple Object Access Protocol ("SOAP"). HTTPS is a web protocol built into its browser that encrypts and decrypts user page requests as well as pages that are returned by the Web server. SOAP is a method for a program running in one kind of operating system to communicate with another program in the same or another kind of operating system using the Internet as the mechanism for information exchange. SOAP specifies exactly how to encode information so that a program in one computer can call a program in another computer and pass the information. In addition, it stipulates how the called program returns a response as well.

Digital certificates are preferably used as a means of authentication as well as non-repudiation of bids placed. As a preferable restriction, the contracts between the producers and consumers are binding and non-transferable, in order to eliminate bidding to find price points with subsequent non-completion of the contract. This limitation also protects the producers offering their free pools at a lower price from consumers who might resale the purchased free pools of resources to other consumers at a higher price.

CONCLUSION

The present invention has been described in general terms and by use of illustrative embodiment examples. It is within the skill of those in the art to make certain alterations modifications, such as programming language, computing platforms, implementation methodology, in order to realize an alternative embodiment of the invention for use with an alternative system. Therefore, the scope of the present invention should be determined by the following claims.

What is claimed is:

1. A system for allocating available resources in an on-demand computing environment comprising:

a first computer system having a processor to predict on-demand computing resource supply from at least one resource producer according to historical supply trend data to predict future available on-demand computing resources;

a second computer system having a processor to place one or more usage bids for on-demand computing resources on behalf of at least one consumer device;

a third computer having a processor to receive the usage bids, to determine if conditions specified by any usage bids match any of the predicted available on-demand computer resource supply, and to notify the first computer system and the second computer system of the match; and a fourth computer system having a processor to establish a contract for future consumption of the matched on-demand computing resource supply.

2. The system as set forth in claim 1 further comprising:

at least one tier-based dynamic incentive schema stored in a tangible, computer-readable storage memory device produced by the first computer, wherein the schema containing a plurality of tiers of bidder definitions, and containing an incentive resource to be allocated to a winning bidder; and a tier-based arbitrator cooperative with the third computer system to evaluate the usage bids, the predicted available on-demand computing resources, and the schema to determine if a usage bid matches a listing and associated TDI, wherein the tiers comprise groups of bidders which can bid by invitation only and which meet a set reserved price criterion, each tier having a lowering trend of reserve pricing until the "no reserved" price auction scheme is reached, thereby limiting bidding to bidders which can afford the reserved price.

3. The system as set forth in claim 1 wherein the first computer system is further to monitor resource availability from a producer over a period of time, and to update a historical trend of available resources according to the monitored period of time.

4. The system as set forth in claim 1 wherein the second computer system is further adapted to monitor resource consumption by a consumer over a period of time, to update a historical trend of resource consumption according to the monitored period of time, and to produce usage bids for resources expected to be needed in a future period of time according to the historical trend of resource consumption.

5. The system as set forth in claim 1 wherein the third computer system is further to notify the second computer system of a highest bid and further to place subsequent usage bids responsive to the notification until a usage bid is accepted, or until a usage bid reaches a predetermined level.

6. The system as set forth in claim 1 wherein the third computer system is further to notify the first computer of a highest bid placed, and further to update the predicted available resources responsive to the notification until a usage bid is accepted, or until the predicted available resources reach a predetermined supply level.

7. The system as set forth in claim 1 wherein the first computer system is further to withdraw resources from predicted availability under at least one predetermined condition selected from the group consisting of failure to receive a usage bid matching a reserve price, failure to receive a matching usage bid within a period of offering time, and failure to receive a matching usage bid from a qualified consumer.

8. The system as set forth in claim 1 wherein the third computer system comprises a plurality of agent computing systems, each of the agent computing systems being to receive the prediction of available on-demand computing resources and the usage bids, and to communicate the usage bids, prediction, and notifications to other agent computing systems.

9. The system as set forth in claim 1 wherein the first computer system and the third computer system employ digital certificates to authenticate the prediction of available on-demand computing resources.

10. The system as set forth in claim 9 wherein the digital certificates are employed to prevent repudiation of the established contract for consumption.

11. The system as set forth in claim 1 wherein the second computer system and the third computer system employ digital certificates to authenticate the usage bids.

12. The system as set forth in claim 11 wherein the digital certificates are employed to prevent repudiation of the established contract for consumption.

13. A method for allocating available resources in an on-demand computing environment, the method comprising:
predicting by a first computer system having a processor on-demand computing resource supply from at least one resource producer according to historical supply trend data to predict future available on-demand computing resources;
placing by a second computer system having a processor to place one or more usage bids for on-demand computing resources on behalf of at least one consumer device;
receiving by a third computer having a processor the usage bids;
determining by the third computer if conditions specified by any usage bids match any of the predicted available on-demand computer resource supply;
notifying by the third computer to the first computer system and to the second computer system of the match; and
establishing by a fourth computer system having a processor a contract for future consumption of the matched on-demand computing resource supply.

14. The method as set forth in claim 13 further comprising:
producing by the first computer at least one tier-based dynamic incentive schema containing a plurality of tiers of bidder definitions, and containing an incentive resource to be allocated to a winning bidder; and
evaluating by the third computer, the usage bids, the predicted available on-demand computing resources, and the schema; and
wherein the determining a usage bid match is performed according to the schema, and wherein the tiers comprise groups of bidders which can bid by invitation only and which meet a set reserved price criterion, each tier having a lowering trend of reserve pricing until the "no reserved" price auction scheme is reached, thereby limiting bidding to bidders which can afford the reserved price.

15. The method as set forth in claim 13 further comprising:
monitoring by the first computer system resource availability from a producer over a period of time; and
updating by the first computer system the historical trend of available resources according to the monitored period of time.

16. The method as set forth in claim 13 further comprising:
monitoring by the second computer system on-demand resource consumption by a consumer device over a period of time;
updating a historical trend of resource consumption according to the monitored period of time; and
producing usage bids by the second computer system for resources expected to be needed in a period of time in the future according to the historical trend of resource consumption.

17. The method as set forth in claim 13 further comprising:
notifying the second computer system by the third computer system of a highest usage bid placed; and
placing by the second computer system one or more subsequent usage bids responsive to the notification until a usage bid is accepted, or until a usage bid reaches a predetermined level.

18. The method as set forth in claim 13 further comprising:
notifying the first computer system by the third computer system of a highest bid; and
updating by the first computer system the prediction of available resources responsive to the notification until a usage bid is accepted, or until the prediction of available resources reaches a predetermined level.

19. The method as set forth in claim 13 further comprising:
withdrawing by the first computer system the prediction of available on-demand computing resources under at least one predetermined condition selected from the group consisting of failure to receive a usage bid matching a reserve price, failure to receive a matching usage bid within a period of offering time, and failure to receive a matching usage bid from a qualified consumer device.

20. The method as set forth in claim 13 further comprising a plurality of agent computing systems to receive the prediction and usage bids, and to communicate the usage bids, prediction, and notification to other agent computing systems.

21. The method as set forth in claim 13 further comprising employing digital certificates to authenticate the prediction between the third computer system and the first computer system.

22. The method as set forth in claim 21 wherein the digital certificates are employed to prevent repudiation of the established contract for consumption.

23. The method as set forth in claim 13 further comprising employing digital certificates to authenticate the usage bids between the third computer system and the second computer system.

24. The method as set forth in claim 23 wherein digital certificates are employed to prevent repudiation of the established contract for consumption.

25. A computer program product for allocating future available resources in an on-demand computing environment, comprising:
first program code encoded by a tangible, computer-readable storage memory device, for predicting by a first computer system on-demand computing resource supply from at least one resource producer according to historical supply trend data to predict future available on-demand computing resources;
second program code encoded by a tangible, computer-readable storage memory device, for placing by a second computer system to place one or more usage bids for on-demand computing resources on behalf of at least one consumer device;
third program code encoded by a tangible, computer-readable storage memory device, for receiving by a third computer the usage bids;
fourth program code encoded by a tangible, computer-readable storage memory device, for determining by the third computer if conditions specified by any usage bids match any of the predicted available on-demand computer resource supply;

fifth program code encoded by a tangible, computer-readable storage memory device, for notifying by the third computer to the first computer system and to the second computer system of the match; and sixth program code encoded by a tangible, computer-readable storage memory device, for establishing by a fourth computer system having a processor a contract for future consumption of the matched on-demand computing resource supply.

26. The computer program product as set forth in claim 25 further comprising:

seventh program code encoded by a tangible, computer-readable storage memory device, for producing at least one tier-based dynamic incentive (TDI) schema by the first computer containing a plurality of tiers of bidder definitions, and containing an incentive resource to be allocated to a winning bidder; and eighth program code encoded by a tangible, computer-readable storage memory device, for evaluating, by a tier-based arbitrator (TA) in cooperation with the third computer system, the received usage bids, the prediction, and the schema; and wherein the determining a bid matches is performed according to the schema, and wherein the tiers comprise groups of bidders which can bid by invitation only and which meet a set reserved price criterion, each tier having a lowering trend of reserve pricing until the "no reserved" price auction scheme is reached, thereby limiting bidding to bidders which can afford the reserved price.

27. The computer program product as set forth in claim 25 further comprising:

seventh program code encoded by a tangible, computer-readable storage memory device, for monitoring by the first computer system resource availability from a producer over a period of time;

eighth program code encoded by a tangible, computer-readable storage memory device, for updating the historical trend of available resources according to the monitored period of time; and ninth program code encoded by a tangible, computer-readable storage memory device, for predicting available on-demand computing of resources expected to be available in a future period of time.

28. The computer program product as set forth in claim 25 further comprising:

seventh program code encoded by a tangible, computer-readable storage memory device, for monitoring by the second computer system on-demand resource consumption by a consumer device over a period of time;

eighth program code encoded by a tangible, computer-readable storage memory device, for updating a historical trend of resource consumption according to the monitored period of time; and ninth program code encoded by a tangible, computer-readable storage memory device, for producing usage bids by the second computer system for resources expected to be needed in a future period of time.

29. The computer program product as set forth in claim 25 further comprising:

seventh program code encoded by a tangible, computer-readable storage memory device, for notifying the second computer system by the third computer system of a highest bid; and eighth program code encoded by a tangible, computer-readable storage memory device, for placing by the second computer system one or more subsequent usage bids responsive to the notification until a usage bid is accepted, or until a usage bid reaches a predetermined level.

30. The computer program product as set forth in claim 25 further comprising:

seventh program code encoded by a tangible, computer-readable storage memory device, for notifying the first computer system by the third computer system of a highest bid; and eighth program code encoded by a tangible, computer-readable storage memory device, for updating by the first computer system the prediction of available on-demand computing resources responsive to the notification until a usage bid is accepted, or until the prediction reaches a predetermined level.

31. The computer program product as set forth in claim 25 further comprising seventh program code encoded by a tangible, computer-readable storage memory device, for withdrawing by the first computer system the prediction under at least one predetermined condition selected from the group consisting of failure to receive a bid matching a reserve price, and failure to receive a matching bid within a period of offering time, and failure to receive a matching bid from a qualified consumer.

32. The computer program product as set forth in claim 25 further comprising seventh program code encoded by a tangible, computer-readable storage memory device, for a plurality of agent computing systems to receive the prediction and usage bids, and to communicate the usage bids, prediction, and notifications to other the agent computing systems.

33. The computer program product as set forth in claim 25 further comprising seventh program code encoded by a tangible, computer-readable storage memory device, for employing digital certificates to authenticate the listings between the third computer system and the first computer system.

34. The computer program product as set forth in claim 33 wherein the digital certificates are employed to prevent repudiation of the established contract for consumption.

35. The computer program product as set forth in claim 25 further comprising seventh program code encoded by a tangible, computer-readable storage memory device, for employing digital certificates to authenticate the bids between the third computer system and the second computer system.

36. The computer program product as set forth in claim 35 wherein the digital certificates are employed to prevent repudiation of the established contract for consumption.

* * * * *